US010657260B2

(12) United States Patent
Govindarajan et al.

(10) Patent No.: US 10,657,260 B2
(45) Date of Patent: May 19, 2020

(54) ELECTRONIC DEVICES AND METHODS SUPPORTING UNSECURED SYSTEM-ON-CHIP SECURE BOOT FUNCTIONALITIES

(71) Applicant: SLING MEDIA PVT LTD, Bangalore (IN)

(72) Inventors: Jagan Kumar Govindarajan, Bangalore (IN); Satish Iyer, Bangalore (IN)

(73) Assignee: SLING MEDIA PVT LTD, Bangalore (IN)

( * ) Notice: Subject to any disclaimer, the term of this patent is extended or adjusted under 35 U.S.C. 154(b) by 85 days.

(21) Appl. No.: 15/708,972

(22) Filed: Sep. 19, 2017

(65) Prior Publication Data
US 2019/0087578 A1  Mar. 21, 2019

(51) Int. Cl.
| | | |
|---|---|---|
| G06F 21/00 | (2013.01) |
| G06F 21/57 | (2013.01) |
| G06F 21/62 | (2013.01) |
| G06F 9/4401 | (2018.01) |
| G06F 21/60 | (2013.01) |

(52) U.S. Cl.
CPC .......... *G06F 21/575* (2013.01); *G06F 9/4406* (2013.01); *G06F 21/602* (2013.01); *G06F 21/62* (2013.01)

(58) Field of Classification Search
CPC ...... G06F 9/4401; G06F 9/4406; G06F 9/328; G06F 21/57; G06F 21/572; G06F 21/575
See application file for complete search history.

(56) References Cited

U.S. PATENT DOCUMENTS

| | | | | |
|---|---|---|---|---|
| 9,230,112 B1* | 1/2016 | Peterson | ............... | G06F 21/575 |
| 9,424,430 B2* | 8/2016 | Rosenan | ............... | G06F 21/575 |
| 9,658,859 B2* | 5/2017 | Le | .......... | G06F 9/4401 |
| 10,419,217 B2* | 9/2019 | He | ...... | G06F 12/1408 |

(Continued)

OTHER PUBLICATIONS

Shijun Zhao et al., Providing Root of Trust for ARM TrustZone using On-Chip SRAM, Nov. 2014, ACM, pp. 25-36.*

(Continued)

*Primary Examiner* — Luu T Pham
*Assistant Examiner* — Fahimeh Mohammadi
(74) *Attorney, Agent, or Firm* — Lorenz & Kopf LLP

(57) ABSTRACT

Electronic device and methods supporting secure boot functionalities performed utilizing an unsecured System-on-Chip (SoC) are provided. In various embodiments, the electronic device contains an unsecured SoC, a locked off-chip Non-Volatile Memory (NVM) component, and an unlocked off-chip NVM component. An on-chip or first stage boot loader program is stored in a first on-chip memory area; and, when execute, causes an on-chip processor to loads an image of a cryptographic key, such as a public key, into a second on-chip memory area. The cryptographic key is stored in the locked off-chip NVM component, possibly in conjunction with a second stage boot loader program. The on-chip processor then utilizes the cryptographic key, alone or in combination with other data, as a root-of-trust to verify the authenticity of one or more software components, such as an operating system, stored in the unlocked off-chip NVM component prior to booting the software component(s).

13 Claims, 3 Drawing Sheets

(56) References Cited

U.S. PATENT DOCUMENTS

Figure 1:
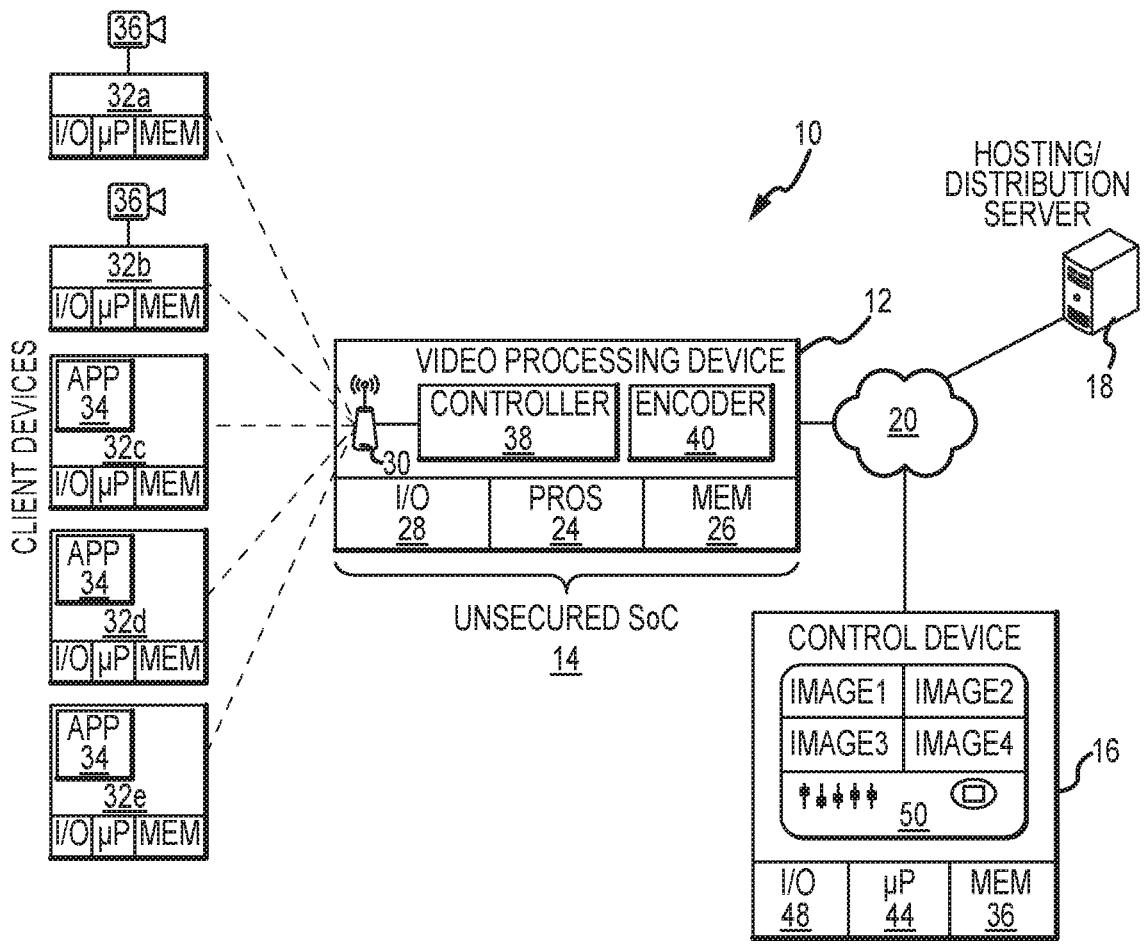

| | | | | |
|---|---|---|---|---|
| 2007/0192610 A1* | 8/2007 | Chun | | G06F 21/575 713/176 |
| 2008/0086630 A1* | 4/2008 | Rodgers | | G06F 21/575 713/2 |
| 2008/0271163 A1* | 10/2008 | Stillerman | | G06F 21/572 726/30 |
| 2014/0281464 A1* | 9/2014 | Le | | G06F 9/4401 713/2 |
| 2015/0082015 A1* | 3/2015 | Chen | | G06F 1/26 713/2 |
| 2015/0188707 A1* | 7/2015 | Gehrer | | H04L 9/14 380/30 |
| 2016/0134621 A1* | 5/2016 | Palanigounder | | H04W 12/06 713/156 |
| 2017/0090909 A1* | 3/2017 | Guo | | G06F 8/66 |
| 2017/0097830 A1* | 4/2017 | Ehrenberg | | G06F 9/4406 |
| 2017/0244562 A1* | 8/2017 | He | | H04L 9/08 |
| 2017/0249161 A1* | 8/2017 | Le | | G06F 9/4401 |
| 2019/0334922 A1* | 10/2019 | Ratiner | | G06F 21/53 |

OTHER PUBLICATIONS

Johannes Winter, Trusted Computing Building Blocks for Embedded Linux-based ARM TrustZone Platforms, Oct. 2008, ACM, pp. 21-30.*

L.H Adnan etal., Secure Boot Process for Wireless Sensor Node, Mar. 17, 2011, IEEE, pp. 646-649.*

Kurt Dietrich et al., Secure Boot Revisited, Dec. 12, 2008, IEEE, pp. 2360-2365.*

* cited by examiner

ELECTRONIC DEVICES AND METHODS SUPPORTING UNSECURED SYSTEM-ON-CHIP SECURE BOOT FUNCTIONALITIES

TECHNICAL FIELD

The following generally relates to system-on-chip devices, and, more particularly, to electronic device and methods supporting secure boot functionalities performed utilizing an unsecured system-on-chip.

ABBREVIATIONS

The following abbreviations appear throughout this document:
AP—Access Point;
BL—Boot Loader;
DVI—Digital Video Interface;
EEPROM—Electrically Erasable Programmable Read-Only Memory;
FCC—Federal Communications Commission;
GPU—Graphical Processing Unit;
IC—Integrated Circuit;
IEEE—Institute of Electrical and Electronics Engineers;
I/O—Input/Output;
LAN—Local Area Network;
NVM—Non-Volatile Memory;
RAM—Random Access Memory;
RF—Radio Frequency;
ROM—Read Only Memory;
RoT—Root-of-Trust;
SoC—System-on-a-Chip or System-on-Chip;
WAN—Wide Area Network; and
VM—Volatile Memory.

BACKGROUND

Generally stated, an SoC is a type of IC combing one or more processors and other microelectronic components or elements on a single substrate, such as singulated piece of a bulk silicon wafer, a singulated piece of a silicon-on-insulator wafer, or the like. In addition to a primary processor, an SoC may also include additional processors, a GPU, RF or other wireless communication components, and perhaps integrated "on-chip" storage areas. Due to their compact size and relatively low power consumption characteristics, SoCs are incorporated into wide variety of consumer electronic devices or systems, particularly smart phones, tablets, wearable devices, and other portable, compact electronic devices. When incorporated into an electronic device or system, an SoC may be mounted to and electrically interconnected with electrically-conductive routing features provided on a supportive substrate, such as metal traces and contact pads provided on a printed wiring board.

While providing the above-noted advantages, SoCs remained limited in certain respects. For example, conventional SoCs are often produced as unsecured devices lacking secure boot functionalities; that is, features by which the integrity or authenticity of firmware and, more broadly, software components can be reliably verified upon SoC startup utilizing cryptographic information. This represents a limitation when it is desired to utilize an unsecured SoC to securely boot other electronic components, such as embedded software components, contained within the larger electronic device or system. Secure booting may be desirably performed to protect embedded devices from inadvertently loading malicious software upon startup. In other instances, secure booting of embedded components may be desirable or required to satisfy regulations issued by a regulatory authority, such as the FCC. There consequently exists an ongoing demand for the development of unsecured SoCs capable of providing secure boot functionalities. Embodiments of unsecured SoCs having secure boot functionalities are provided herein, as are devices containing secure boot-enabled SoCs and methods carried-out thereby.

BRIEF SUMMARY

The following describes electronic device and methods supporting secure boot functionalities performed utilizing an unsecured system-on-chip. In various embodiments, the electronic device includes an SoC and a locked off-chip memory component, such as off-chip locked flash memory. As indicated by the term "off-chip," the locked off-chip memory component is separate and apart from the SoC; that is, the off-chip memory component does not form an integral part of the SoC. As indicated by the term "locked," the locked off-chip memory component is configured or manufactured to prevent write access to the memory and alteration of the data stored therein. The electronic device further includes a first unlocked memory component, such as off-chip unlocked flash memory. A first software component is stored in the first unlocked memory component. So too is associated cryptographic data, such as a digital signature generated utilizing a private key. When performing a secure boot method, which may commence upon SoC startup in certain instances, the SoC is configured to: (i) determine whether the first software component can be verified as trustworthy based, at least in part, upon whether the associated cryptographic data corresponds with the locked cryptographic data; and (ii) boot the first software component providing that the first software component can be verified as trustworthy. The SoC may perform such processes iteratively during the secure boot method to further conditionally boot additional software components stored in the unlocked flash memory or elsewhere on the electronic device.

Methods performed by SoC-containing devices are further provided. In various embodiments, the method includes the step or process of storing a first software component and associated cryptographic data in the unlocked memory component. Locked cryptographic data, such as locked public key, is stored in the locked off-chip memory component. The trustworthiness of the first software component is then assessed by the SoC based, at least in part, upon whether the associated cryptographic data corresponds with the locked cryptographic data; e.g., in an embodiment in which the locked cryptographic data and the associated cryptographic data comprise a public key and a digital signature, respectively, the associated cryptographic data may be determined to correspond with the locked cryptographic data when the digital signature is generated utilizing a private key corresponding to the public key. If assessing the first software component to be trustworthy, and providing that other verification or integrity measures are also satisfied (if performed), the SoC boots the first software component. Alternatively, booting of the first software component may be avoided and certain other actions may be performed; e.g., the method may terminate, the method may progress to attempting to securely boot other software in queue, or the method may instead boot recovery firmware as obtained from, for example, a cloud-based service.

In further embodiments, the method includes the steps or processes of loading a first stage firmware component and a locked or unalterable public key into a first memory area of the SoC from a locked flash memory external to the SOC. The first stage firmware component is then booted, which causes a second stage firmware component and a digital signature to be loaded into an off-chip RAM in accordance with instructions stored in the first stage firmware component. It is then determined whether the digital signature data can be verified utilizing the locked public key previously loaded from the locked flash memory. The second stage firmware component is booted if determining that the digital signature data can be verified utilizing the public key. In certain implementations, the first stage firmware component may assume the form of or include a second stage BL, while the second stage firmware component assumes the form of or includes an operating system and an associated kernel. A first stage BL may further be stored in an NVM area of the unsecured SoC and initially executed upon SoC startup in at least some instances.

The foregoing methods and variants thereof can be implemented through software or program products bearing computer-readable instructions. Various additional examples, aspects, and other features of embodiments of the present disclosure are described in more detail below.

BRIEF DESCRIPTION OF THE DRAWING FIGURES

Figure 2:
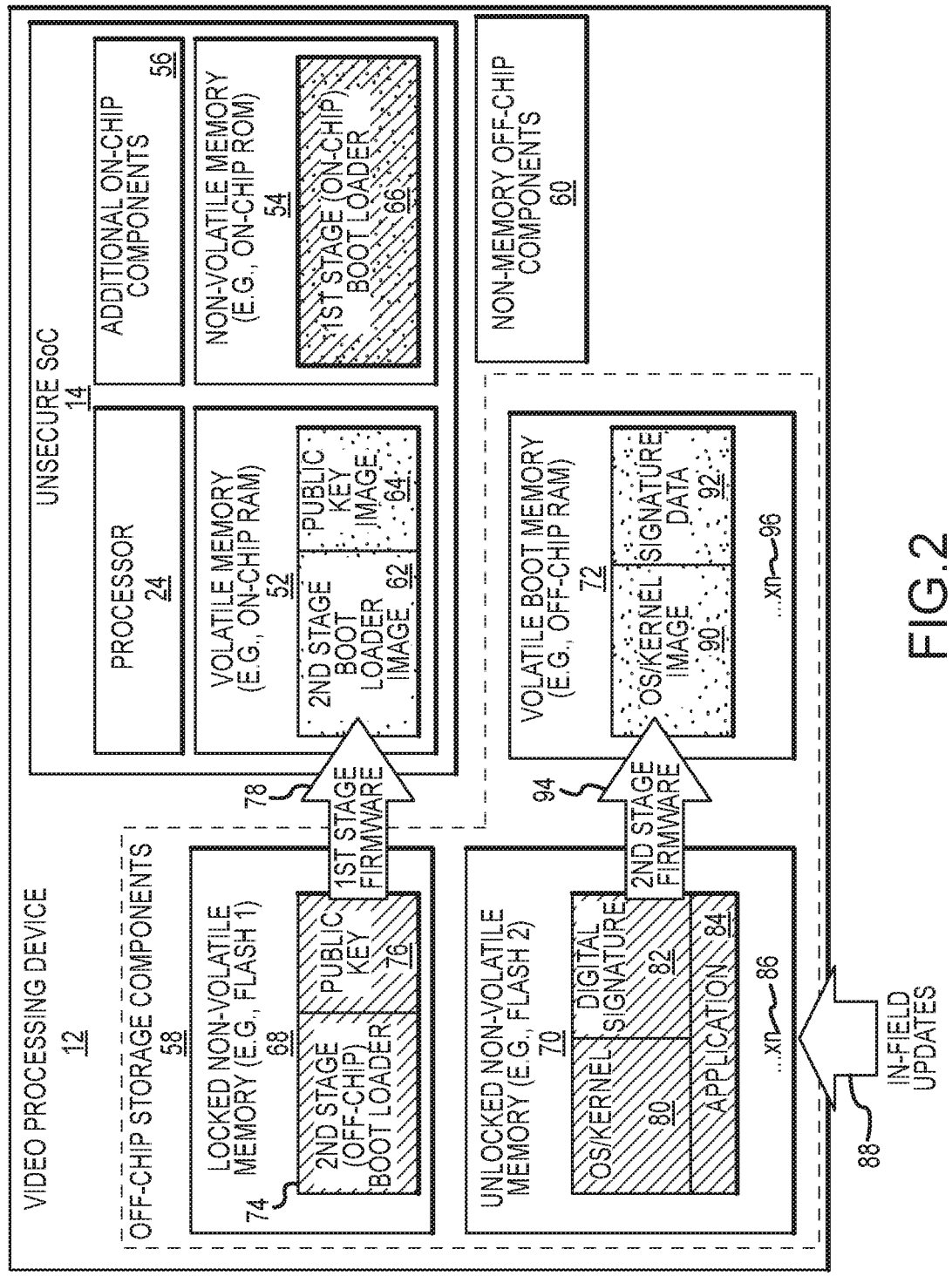
Figure 3:
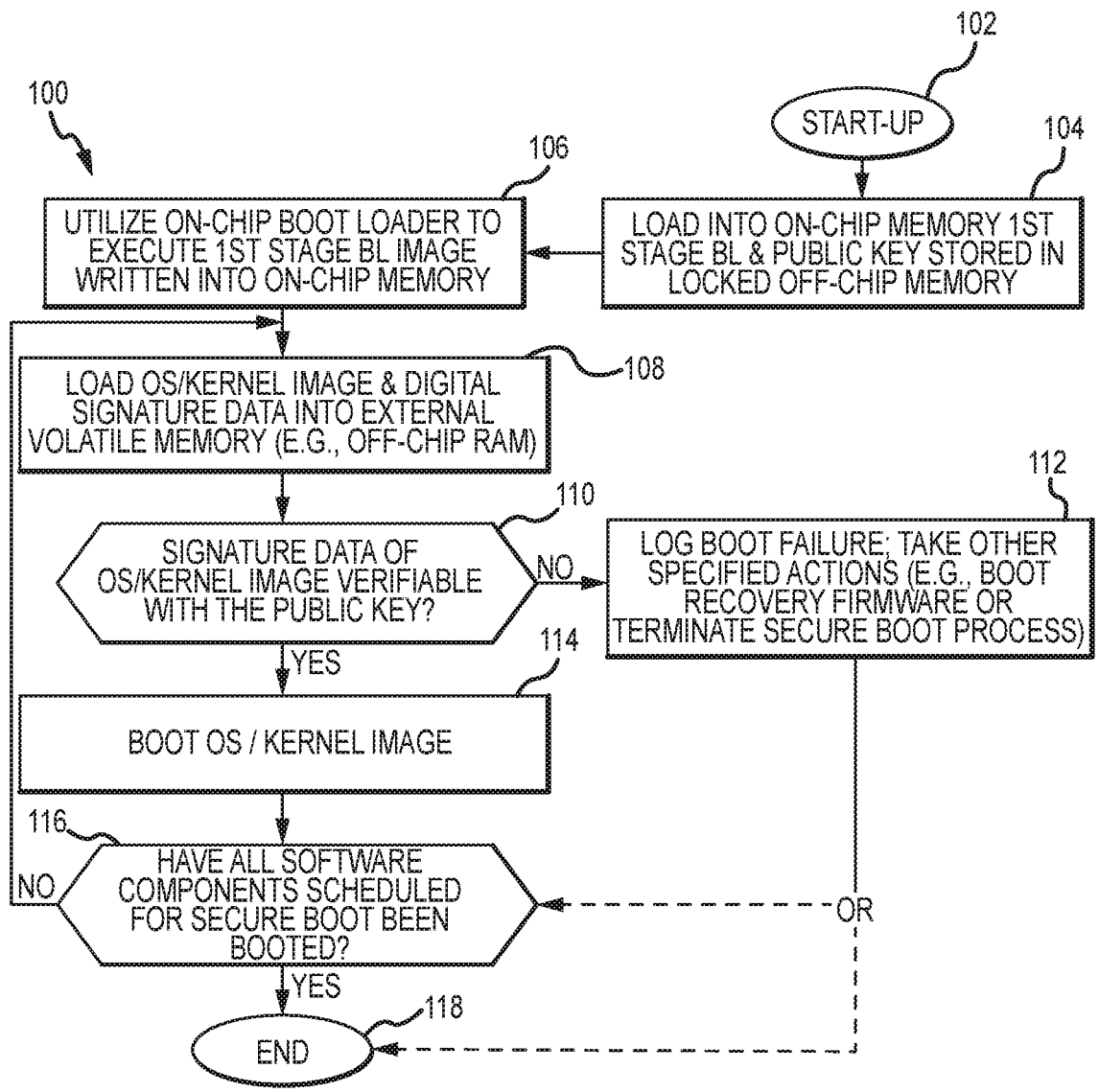

Exemplary embodiments will hereinafter be described in conjunction with the following drawing figures, wherein like numerals denote like elements, and:

FIG. 1 is a diagram of a video production system including an electronic device (here, a video processing device), which contains at least one unsecured SoC having a secure boot functionality, as illustrated in accordance with an exemplary embodiment of the present disclosure;

FIG. 2 a schematic of the video processing device shown in FIG. 1 illustrating the secure boot-enabled SoC, several SoC-external or "off-chip" memory components further contained in the video processing device, and data temporarily or permanently stored in the on-chip and off-chip memory areas during an exemplary implementation of the secure boot method; and FIG. 3 is a flowchart setting-forth an exemplary secure boot method carried-out by the secure boot-enabled SoC shown in FIG. 2 utilizing data stored in the off-chip memory areas, as illustrated in accordance with a further exemplary embodiment of the present disclosure.

DETAILED DESCRIPTION

The following detailed description of the invention is intended to provide various examples, but it is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Embodiments of an electronic device are provided, which support secure boot functionalities performed utilizing an unsecured SoC. Similarly, methods for securely booting components, such as embedded firmware and other software components, utilizing an unsecured SoC are further provided. Through such devices and methods, an unsecured SoC can be utilized to securely boot embedded components upon SoC startup to prevent such components from loading malicious code, to satisfy prevailing regulations, or to provide other benefits. Embodiments of the below-described devices and methods can be implemented with minimal additional cost as compared to conventional SoC-containing devices. Additionally, in at least some embodiments, the devices and methods support securitized in-field upgrades to software components, which are subsequently executed by the SoC-containing device.

In various embodiments, the SoC stores a first stage BL program in an NVM area contained in the SoC, such as an on-chip ROM area. The first stage BL program is initially executed by an on-chip processor upon SoC startup. Code stored in the first stage BL program, when executed, instructs the processor to load a second stage BL program and associated cryptographic data (e.g., a public key) from a secured off-chip NVM area (e.g., locked off-chip flash memory) into an on-chip memory area, such as on-chip RAM. The second stage BL image, as now written into the on-chip VM area, is executed and causes the on-chip processor to further access an unsecured off-chip NVM area realized as, for example, an unlocked flash memory component. At least one software component, such as an OS and its associated kernel (jointly referred to herein as an "OS/kernel"), scheduled for secure booting is stored within the unsecured off-chip NVM area along with a corresponding digital signature. The processor, acting in accordance with coded instructions read from the second stage BL program, subsequently loads an image of the OS/kernel and the software signature from the unsecured off-chip NVM area into another memory area, such an off-chip VM (e.g., ROM) area, referred to herein as the "off-chip boot memory." Signature verification is then performed utilizing at least the public key. If the digital signature is verifiable utilizing the public key, the processor boots the OS/kernel from the off-chip boot memory. This process may then be repeated, as appropriate, to sequentially load other software components stored in the off-chip boot memory and/or stored in other memory areas of the electronic device.

In the above-described manner, the public key and second stage BL image are leveraged for usage as a "Root-of-Trust" or "RoT" in verifying the authenticity of the digital signature of software components subject to secure booting. Data integrity is ensured as the public key and second stage BL image are loaded from the secured off-chip NVM area, such as flash memory locked at the time of manufacture, in accordance with instructions from the first stage BL program. The end result is an electronic device, which supports secure booting of embedded firmware and other software components utilizing an unsecured SoC and which can be manufactured in cost effective manner. Additionally, embodiments of the electronic device permit secure in-field modifications to securely-booted programming or software (e.g., as may be desired to update existing software or install new software) by permitting such data to be written into a memory of the electronic device along with appropriate cryptographic data. Such in-field upgrades or updates are usefully written into unlocked the above-described off-chip memory component, such as unlocked off-chip flash memory.

Embodiments of the SoC-containing electronic device can assume various forms. In many cases, the electronic device may be relatively compact and contain embedded firmware, which are desirably securely booted upon SoC startup. As indicated above, secure booting of such components may be desirable to decrease the likelihood of loading spurious or malicious code upon startup. Additionally, in certain cases, regulatory authorities may promote or require secure booting of certain software components, depending upon the particular usage of the electronic device. For example, regulations promulgated by the FCC in the United States may require secure booting of certain components when the SoC-containing device is utilized as or to support the operation of a wireless transmitter, receiver, or transceiver. Such regulations may thus pose an obstacle to the usage of electronic devices containing unsecured SoCs lacking secure boot functionalities for wireless communication purposes. For this reason, implementations of the SoC-containing electronic device are usefully (although not necessarily) support the operation of a wireless (e.g., Wi-fi) transceiver. An example of a video processing device including a wireless transceiver will now be described in conjunction with FIG. 1. The following description is presented solely to establish an exemplary context in which embodiments of the present disclosure may be better understood. It is emphasized that embodiments of the SoC-containing electronic device need not assume the form of a video processing device or include a wireless transceiver in all instances, but rather can be implemented as any type of electronic device containing an unsecured SoC and desirably imparted with secure boot capabilities.

FIG. 1 is a schematic of a video production system 10 including a video processing device 12, which contains at least one unsecured SoC 14 and which is usefully implemented in accordance with the teachings of the present disclosure. Video production system 10 is utilized in the production of a video programming or content, which is compiled from selected content streams received from multiple input video feeds. In the illustrated example, video production system 10 includes a video processing device 12 that selects and encodes video content based on instructions received from a control device 16. The encoded video program may be initially stored as data files within an external storage device, such as a non-illustrated a memory card, a hard drive disk, other NVM areas, for eventual uploading to a hosting or distribution service 18 operating on a communications network 20; network 20 potentially encompassing the Internet, as well as LANs, WANs, cellular networks, and any other pubic or private networks. In certain implementations, the encoded video program may be directly streamed or otherwise transmitted to a social media platform for viewing by the public, friends, or another group of individuals.

Video processing device 12 contains processing hardware, such as a processor 24, a memory 26, and I/O features 28. I/O features 28 may include a suitable universal serial bus port or other interface to one or more external storage devices. While labeled simply as "memory 26" in FIG. 1, memory 26 generically represents all computer-readable storage areas of video processing device 12. As described more fully below in conjunction with FIG. 2, video processing device 12 contains multiple distinct memory components or areas, at least some of which are integrated into unsecured SoC 14 (herein, "on-chip memory areas" or "on-chip memory sectors") and others of which are physically distinct from SoC 14 (herein, "off-chip memory areas" or "off-chip memory components"). Processor 24 is implemented as an integral part of unsecured SoC 14, while I/O features 28 can be implemented as on-chip I/O features, off-chip I/O features, or a combination thereof.

Video processing device 22 contains computer-readable instructions and logic, which may be realized in any combination of hardware, firmware, and software generally. The computer-readable instructions, when executed by device 22, support implementation of an AP 30 in accordance with pre-established standards, such as IEEE 802.11 or IEEE 802.14 standards. AP 30 may be implemented as a wireless transceiver included within or operatively supported by unsecured SoC 14 in an embodiment. During operation of system 10, video processing device 12 communicates through wireless AP 30 with any number of client devices 32, which are generically illustrated as an array of video capture devices 32(a)-(e) in FIG. 1. Other non-illustrated APs may also be present in the environment, possibly sharing the same channels as those utilized by AP 30. Client devices 32 can include mobile phones, tablets, laptops, and similar devices executing video capture applications 34. Client devices 32 can also potentially include one or more conventional video cameras 36 capable of interacting with processing device 12 via an interface device through which video inputs, such as DVI signals, are received. The received video inputs may then be transmitted to processing device 12 via Wi-fi, BLUETOOTH, or other wireless connection, as appropriate. Alternative embodiments of system 10 can facilitate communications with any other video capture devices in various other manners.

With continued reference to FIG. 1, video processing device 12 further contains a controller 38 and an encoder 40. Controller 38 and/or encoder 40 may be implemented as software logic stored in memory 26 and executed on processor 24. As a more specific example, controller 38 may be implemented as a control application executing on processor 24 including logic for implementing the various processes described herein. In other embodiments, the various functions and features may be implemented in hardware, software, firmware, or a combination thereof executing on other components, as desired. Encoder 40, for example, may be implemented using a dedicated video encoder chip in alternative implementations of video processing device 12. Regardless of the particular manner in which the components of device 12 are implemented, video processing device 12 operates in response to user inputs supplied by control device 16. Accordingly, control device 16 may correspond to any type of computing device containing at least one processor 44, memory 46 and I/O features 48. In various embodiments, control device 16 assumes the form of a tablet, laptop computer, a mobile phone, or other computing device capable of executing a software application 50 suitable for controlling the functions of system 10.

By way of generic example, software application 50 is depicted in FIG. 1 as including a graphical user interface, which presents various video feeds received from video capture devices 32(a)-(e) and which supports user selection of various feeds to encode or otherwise incorporate desired video content into the finalized media product. Application 50 may include other displays to control other behaviors or features of system 10, as desired. Typically, control device 16 interacts with video processing device 12 via a wireless network, although wired connections could be equivalently employed. In operation, a user acting as a video producer executes application 50 to enable viewing of the various video feeds available from one or more video capture devices 32(a)-(e). The selected video feed is received from client devices 32 by video processing device 12. Video processing device 12 suitably compresses or otherwise encodes the selected video in an appropriate format for eventual viewing or distribution. Video encoding via encoder 40 occurs according to any standard, non-standard, or other protocol, such as MPEG4.

Referring now to FIG. 2, video processing device 12 is schematically shown in greater detail as depicted in accordance with an exemplary implementation of the present disclosure. Reference numerals are carried-over from the example of FIG. 1 to the example of FIG. 2, where appropriate. Generally, in the schematic of FIG. 2, video processing device 12 is depicted as including unsecured SoC 14, which contains processor 24, multiple on-chip memory or storage areas 52, 54 (encompassed by memory block 26 shown in FIG. 1), and any number of additional on-chip components 56. On-chip components 56 can include, for example, any number of coprocessors, I/O features (included in or corresponding to I/O features 28 shown in FIG. 1), GPUs, RF components, and the like, to list but a few examples. In addition to those components included in SoC 14, video processing device 12 also includes multiple off-chip storage components 58 and, perhaps, other (non-memory) off-chip components 60. Off-chip components 60 can include, for example, RF modules, smart card readers, additional processors, user interfaces, and various other components known in the art.

Unsecured SoC 14 can include any practical number and type of on-chip memory or storage areas 52, 54. In the illustrated example, specifically, unsecured SoC 14 includes a first on-chip storage area 52 realized utilizing a volatile storage medium (hereafter, "on-chip VM area 52") and a second on-chip storage area 54 realized utilizing a non-volatile storage medium (hereafter, "on-chip NVM area 54"). On-chip VM area 52 and on-chip NVM area 54 can be implemented utilizing any memory types, currently known or later developed. In one embodiment, on-chip VM area 52 is realized as on-chip RAM, while on-chip NVM area 54 is realized as on-chip ROM. Due to its volatile nature, on-chip VM area 52 generally does not retain data when unsecured SoC 14 is powered down. However, processor 24 may write certain data into on-chip VM area 52 as, for example, a BL image 62 and a public key image 64 (or similar cryptographical key) during execution of the below-described secure boot method. The transitory or non-permanent nature of BL image 62 and public key image 64 are indicated in FIG. 2 by a first fill (dot stippling) pattern. Comparatively, on-chip NVM area 54 may store an on-chip BL program 66, which is retained within NVM area 54 in a permanent or non-transitory manner through power cycling of SoC 14, as further indicated in FIG. 2 by a second fill (cross-hatch) pattern. On-chip BL program 66 may be initially executed during the below-described secure boot process and may thus also be referred to as "first stage BL 66" herein.

In the exemplary embodiment of FIG. 2, off-chip storage components 58 contain three distinct types of memory or computer-readable storage components: (i) locked off-chip NVM component 68, (ii) unlocked off-chip NVM component 70, and (iii) VM boot component 72. In one implementation, off-chip NVM components 68, 70 are realized as separate or physically distinct EEPROM or flash memories, while unlocked off-chip NVM area 70 is realized as off-chip RAM. Off-chip NVM component 68 is "locked" in the sense that write access to this storage component and the ability to modify the data contained within NVM component 68 is restricted and, preferably, wholly prevented immediately following original manufacture of video processing device 12. Such security measures protect the data integrity of the data stored within locked off-chip NVM component 68, as described below.

As further indicated in FIG. 2, an off-chip or second stage BL program 74 and an associated cryptographic data (here, a public key 76) are stored within locked off-chip NVM component 68. As indicated by the second fill (cross-hatch) pattern, second stage BL program 74 and public key 76 are stored in off-chip NVM component 68 in a permanent manner and, in many cases, are programmed into NVM component 68 during original manufacture of video processing device 12. For example, in one approach, the programming of second stage BL program 74, the programming of public key 76, and the locking of off-chip NVM component 68 occur during a single factory-performed process step. This renders video processing device 12 resistant to, if not wholly impervious to subsequent attempts to modify first stage (off-chip) BL program 74 and public key 76. Various different approaches for memory locking can be employed including, but not limited to, the non-reversible programming of fusible links during original manufacture of off-chip NVM component 68; coding by programming NVM area cells; or through hard coding with permanent connections to logic HIGH and LOW values. In one embodiment, the appropriate settings are permanently locked through the usage of one-time programmable registers in off-chip NVM component 68.

As further indicated in FIG. 2 by arrow 78, second stage BL program 74 and public key 76 may be loaded or imaged into on-chip VM area 52 of SoC 14 as second stage BL image 62 and public key image 64, respectively, during the course of the below-described secure boot method. Here, it will be noted that second stage BL 74 and public key 76 thus constitute first stage firmware, which is loaded before second stage firmware 82, 82, 84 described below. It may also be noted that, considered in a strict sense, it is not necessary to write images of second stage BL program 74 and public key 76 into VM area 52 of SoC 14 in all embodiments, as this data can be read directly from locked NVM component 68. Consequently, embodiments of the present disclosure are open to this possibility. However, efficiency will often be greatly enhanced by loading second stage BL program 74 and public key 76 into on-chip VM area 52 of SoC 14 as second stage BL image 62 and public key image 64 for various reasons; e.g., locked NVM memory component 68 may not yet be capable of efficient access as clock-based synchronous memory access capabilities (e.g., double data rate access) have not yet been configured or are otherwise unavailable.

Unlocked off-chip NVM component 70 stores at least one OS and a corresponding OS kernel 80 (jointly, "OS/kernel 80"). A corresponding or appended digital signature 82, which is generated or signed utilizing at least one private key, is further stored within unlocked off-chip NVM component 70. Unlocked off-chip NVM component 70 may also contain one or more software applications 84, which execute on the OS platform if ultimately booted. Further, as indicated in FIG. 2 by symbol 86, any number of additional firmware or, more broadly, software components may likewise be stored within unlocked off-chip NVM component 70; and, when containing associated digital signature data, booted utilizing the below-described secure boot method. Moreover, as represented by arrow 88 in FIG. 2, existing software components can be updated in-field (or new software components can be uploaded to video processing device 12) through appropriate transmissions including digital signature data, which (if valid) corresponds to public key 76 stored in locked off-chip NVM component 68. As still further represented in FIG. 2 by arrow 94, OS/kernel 80 and digital signature 82 are loaded into off-chip NVM component 70 as OS/kernel image 90 and digital signature data 92, respectively, during the below-described secure boot method.

An example of the secure boot method will now be described in conjunction with FIG. 3. While principally described in conjunction with the secure booting of OS/kernel 80, it will be appreciated that the below-described process steps can be utilized to securely boot any number and type of software components. For example, and as further discussed below, repeated iterations of the secure boot method may be performed to first securely boot OS/kernel 80 and then to securely boot other software components stored in unlocked off-chip NVM component 70 or elsewhere within off-chip storage components 58. In this latter case, images of such components may be sequentially loaded into off-chip NVM component 70 in accordance with a predetermined schedule, queue, or loading order, as indicated by symbol 96. In other implementations of the below-described secure boot method, images of the software (e.g., OS/kernel) scheduled for secure booting may not be loaded into VM boot component 72, but rather read directly from unlocked NVM component 70; however, such an alternative approach will typically result in significant processing lag and is thus generally less desirable than the primary approach described below.

FIG. 3 is a flowchart setting-forth of an exemplary secure boot method 100 that may be carried-out by secure boot-enabled SoC and off-chip memory areas shown in FIG. 2, as illustrated in accordance with a further exemplary embodiment of the present disclosure. Secure boot method 100 includes a number of processes or steps, which are identified as STEPS 102, 104, 106, 108, 110, 112, 114, 116, 118. These steps are each discussed, in turn, below. As shown in FIG. 3 and described below, secure boot method 100 is presented by way of non-limiting example only and with the noted caveat that additional steps may be performed, certain steps may be omitted, or the sequence of steps may vary in alternative embodiments of method 100. For consistency with the example of FIG. 2, secure boot method 100 will be described as carried-out by processor 24 of unsecured SoC 14.

Referring jointly to FIGS. 2-3, secure boot method 100 commences at STEP 102 with the startup of unsecured SoC 14 or another predetermined trigger event. At this juncture, processor 24 executes first stage BL program 66 stored in on-chip NVM area 54. In accordance with instructions contained in first stage BL program 66, processor 24 advances to STEP 106 and loads second stage (off-chip) BL program 74 and public key 76 from locked off-chip NVM component 68 into on-chip VM area 52 (again, indicated in FIG. 2 by arrow 78). After second stage BL program 74 is loaded into on-chip VM area 52 as second stage BL image 62, processor 24 executes second stage BL image 62 and progresses to STEP 108 of method 100. At STEP 108, processor 24 loads OS/kernel 80 from unlocked off-chip NVM component 70 into VM boot component 72 as OS/kernel image 90 (again, indicated in FIG. 2 by arrow 94). Essentially concurrently, processor 24 further writes digital signature data 92 into VM boot component 72 from signature data 82 further stored in unlocked NVM component 70. Processor 24 then advances to STEP 110 of method 100 and verifies the validity or authenticity of OS/kernel 80. Stated differently, processor 24 next assesses the trustworthiness of OS/kernel 80 and proceeds with booting only if OS/kernel 80 can be verified as trustworthy.

As indicated in FIG. 2, processor 24 may perform the verification process or trust assessment process by determining whether the cryptographic data associated with OS/kernel 80 properly corresponds with the cryptographic data loaded into on-chip VM area 52 from locked NVM component 68. In the instant example, processor 24 determines whether digital signature data 92, as written into VM area 52, is capable of verification utilizing public key image 64 created within VM boot component 72. In certain embodiments, an additional cryptographic data stored in another area on unsecured SoC 14 (e.g., second public key stored in on-chip NVM area 54) may be further utilized to verify the authenticity of digital signature data 92 and OS/kernel image 90 to, for example, provide redundancy or an additional security layer. Providing that signature data 92 can be adequately verified in this manner, processor 24 advances to STEP 114 and boots OS/kernel image 90 from on-chip VM boot component 72. Alternatively, if digital signature data 92 cannot be adequately verified, processor 24 foregoes booting of OS/kernel image 90 and instead progress to STEP 112 of secure boot method 100, as discussed more fully below.

At STEP 116 of secure boot method 100, processor 24 determines whether all software components desirably started by secure boot have, in fact, been securely booted. If this is the case, processor 24 progresses to STEP 118 and secure boot method 100 concludes. Conversely, if additional software components scheduled for secure boot have not yet been securely booted, processor 24 returns to STEP 108 and repeats the above-described process steps. In this manner, processor 24 may sequentially provide secure booting of all properly-verified software components stored within unlocked NVM component 70 (and possibly stored in other off-chip storage components 58) until all components desirably subject to secure booting are booted. Notably, this can include any recently-updated software components or newly-added software components uploaded into unlocked NVM component 70 via in-field updates 88 (FIG. 2), providing that such updated or new components possess digital signatures verifiable with public key 76 stored in locked NVM component 68 and, therefore, public key image 64 written into on-chip VM boot component 72.

As indicated above, if digital signature data 92 cannot be adequately verified (e.g., signature data 92 does not properly correspond to public key image 64 loaded into on-chip VM area 52), processor 24 foregoes booting of OS/kernel image 90 and instead progress to STEP 112 of method 100. During STEP 112, one or more specified actions are carried-out in response to the inability to verify the cryptographic data associated with OS/kernel 80 or another software component for which secure booting was attempted. Such actions will often include the creation of a boot failure log, which may be stored in any suitable storage area, such as unlocked NVM component 70, for diagnostic purposes. In certain embodiments, and as indicated in FIG. 3 by the lower path (drawn in phantom line) connecting STEP 112 to STEP 118, secure boot method 100 may terminate at this juncture. In other embodiments, and as indicated by the middle path (also drawn in phantom line), processor 42 may advance to STEP 116 and attempt to securely boot other software components next in the queue, as previously described. In this latter case, processor 42 may further boot (e.g. utilizing the above-described secure boot process) recovery firmware enabling device 12 to restore proper operation despite the initial inability to securely boot OS/kernel image 90. When booted, such recovery firmware may be utilized to recover the invalid firmware via an appropriate data connection from a trusted source, such as a cloud-based service.

There has thus been described embodiments of an electronic device, which contains an unsecured SoC capable of supporting secure boot functionalities. Generally stated, embodiments of the above-described SoC-containing electronic device utilize images of an off-chip or second stage BL program and accompanying cryptographic data (e.g., a public key) as a RoT to verify the authenticity or integrity of software (e.g., an OS and kernel) prior to booting such software. The second stage BL program and accompanying cryptographic key are conveniently stored in an off-chip NVM component, such as flash memory, which is locked (e.g., during original production of the electronic device) in a secure manner; e.g., in a manner preventing subsequent modification to the data stored within this NVM component without destruction thereof. This, in turn, ensures the integrity of the second stage BL program and its associated cryptographic key, when imaged into an on-chip memory area or sector (e.g., on-chip RAM) thereby allowing this data to be safely leveraged as the RoT. Moreover, in certain embodiments, an additional layer of security can be introduced by further requiring the software contained within the unlocked off-chip NVM component and loaded into the off-chip VM boot component to contain an additional digital signature.

Through the usage of such SoC-containing electronic devices, embedded components or devices can be securely booted upon SoC startup to prevent such components from loading malicious code, to satisfy prevailing regulations, or to provide other benefits. Advantageously, embodiments of the SoC-containing electronic devices can be implemented with relatively low, if any additional cost as compared to conventional SoC-containing devices. Additionally, in at least some embodiments, the above-described embodiments of the SoC-containing electronic devices support securitized in-field upgrades to software components executed by the SoC-containing device. In this latter regard, in various implementations, the locked off-chip NVM component containing the second stage BL and corresponding cryptographic (e.g., public) key may be realized as locked flash memory incapable of modification. Comparatively, the unlocked off-chip NVM component containing the software component(s) desirably subject to secure boot may be realized as unlocked flash memory, which can be updated or modified at any time freely or with appropriate security precautions in place. Finally, the foregoing has also provided methods for securely booting components, such as embedded software components, utilizing an unsecured SoC.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Finally, numerical identifiers, such as "first" and "second," have been utilized in the foregoing Detailed Description to reflect an order of introduction of similar elements or features in at least some instances. Such numerical identifiers may also be utilized in the subsequent Claims to reflect the order of introduction therein. As the order of introduction of such elements or features may vary between the Detailed Description and the Claims, the usage of such numerical identifiers may also vary accordingly.

What is claimed is:

1. An electronic device, comprising:
    a locked off-chip memory component that stores a second stage boot loader and a locked cryptographic data comprising a public key;
    a first unlocked memory component in which a first software component and associated cryptographic data are stored;
    a second unlocked memory component; and
    a System-on-Chip (SoC) coupled to the locked off-chip memory and to the first and second unlocked memory components, wherein the SoC comprises a first on-chip memory area comprising a boot loader, the SoC configured to execute the instructions contained in the boot loader to:
    determine whether the first software component can be verified as trustworthy based, at least in part, upon whether the associated cryptographic data is successfully decrypted by the public key of the locked cryptographic data that is stored in the locked off-chip memory;
    follow instructions contained in the second stage boot loader of the locked off-chip memory to write an image of the first software component into the second unlocked memory component; and
    boot the first software component from the second unlocked memory component if the first software component is verified as trustworthy, and otherwise not booting the first software component.

2. The electronic device of claim 1 wherein the associated cryptographic data was previously encrypted using a private key that is held in confidence by a trusted data provider.

3. The electronic device of claim 1 wherein the locked cryptographic data stored in the locked off-chip memory comprises a digital signature; and
    wherein the SoC is configured to determine whether the first software component is trustworthy based, at least in part, on whether the digital signature is verifiable with the public key of the associated cryptographic data.

4. The electronic device of claim 1 wherein the SoC is further configured to:
    execute the first stage boot loader from the first on-chip memory area during startup of the electronic device;
    follow instructions contained in the first stage boot loader to create a boot loader image of the second stage boot loader in a second on-chip memory area; and
    execute the boot loader image from the second on-chip memory area.

5. The electronic device of claim 1 wherein the first software component comprises an operating system.

6. The electronic device of claim 5 wherein further comprising a software application stored in the first unlocked memory component and executable on the operating system; and
    wherein the SoC is further configured to:
        assess whether the software application is trustworthy if determining that the operating system is trustworthy; and
        if assessing the software application to be trustworthy, boot the software application.

7. The electronic device of claim 1 wherein the unlocked memory component comprises a non-volatile off-chip memory component.

8. The electronic device of claim 1 wherein the SoC is further configured to boot recovery firmware in response to a determination that the first software component cannot be verified as trustworthy.

9. The method of claim 8 wherein following instructions comprises:

in accordance with instructions contained in the first stage boot loader, writing a boot loader image of the second stage boot loader from the locked off-chip memory component into a memory area of the SoC; and executing the boot loader image from the memory area of the SoC.

10. A method performed by an electronic device containing a System-on-Chip (SoC) comprising a first on-chip memory area comprising a boot loader, a locked off-chip memory component that stores a second stage boot loader and a public key, and first and second unlocked memory components, the method comprising:

storing a first software component and associated cryptographic data in the first unlocked memory component;

executing instructions contained in the boot loader to determine whether the first software component is verifiable as trustworthy based, at least in part, upon whether the associated cryptographic data is successfully decrypted by the public key stored in the locked off-chip memory component;

following instructions contained in the second stage boot loader of the locked off-chip memory to write an image of the first software component into the second unlocked memory component; and booting the first software component from the second unlocked memory component if verifying the first software component as trustworthy, and otherwise not booting the first software component.

11. The method of claim 10 wherein associated cryptographic data was previously encrypted using a private key that is held in confidence by a trusted data provider.

12. The method of claim 10 wherein the first software component comprises an operating system, and wherein the method further comprises:

if assessing the operating system as trustworthy, (i) booting the operating system and (ii) subsequently determining whether one or more applications further stored in the unlocked memory component and executable by the operating system are trustworthy utilizing the cartographic data stored in the locked off-chip memory component.

13. The method of claim 10 further comprising booting recovery firmware if the first software component cannot be verified as trustworthy.

* * * * *